W. SCHOELLKOPF.
SPRING CUSHIONED AUTOMOBILE WHEEL.
APPLICATION FILED APR. 16, 1917. RENEWED MAY 4, 1918.
1,270,445.
Patented June 25, 1918.
2 SHEETS—SHEET 1.
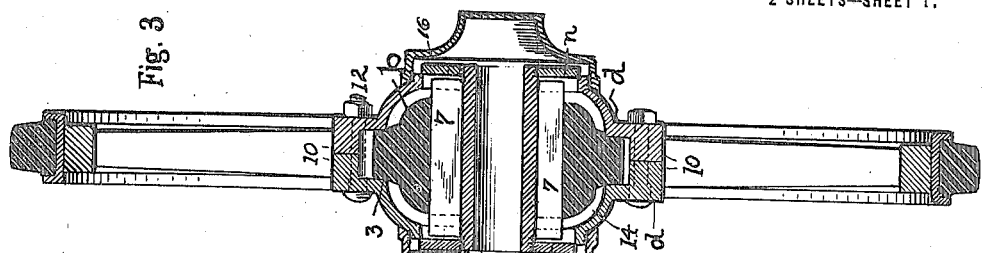
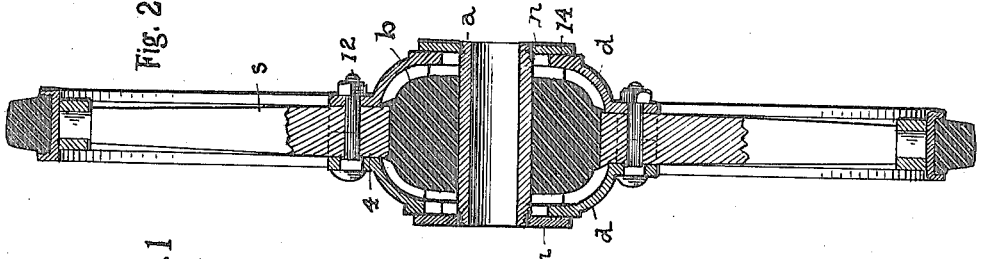
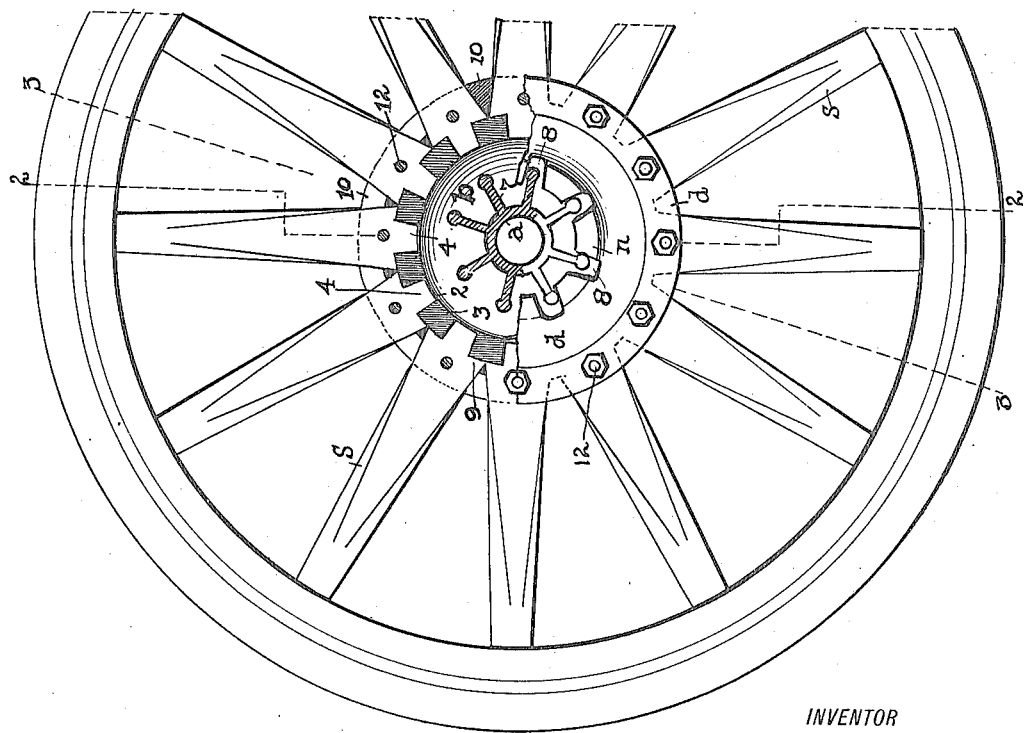
INVENTOR
WILLIAM SCHOELLKOPF
BY
Fisher &c.
ATTORNEYS

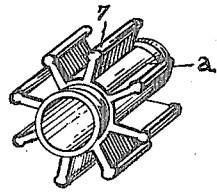
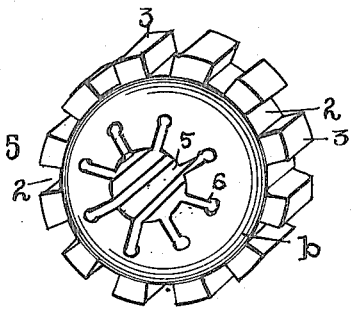
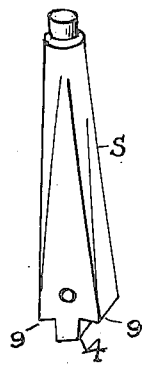
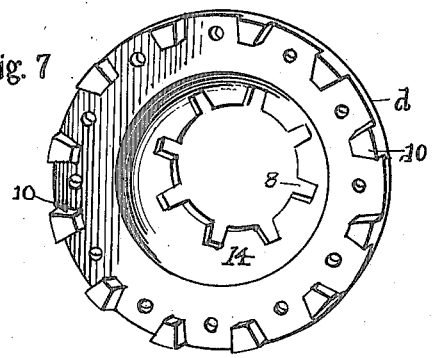
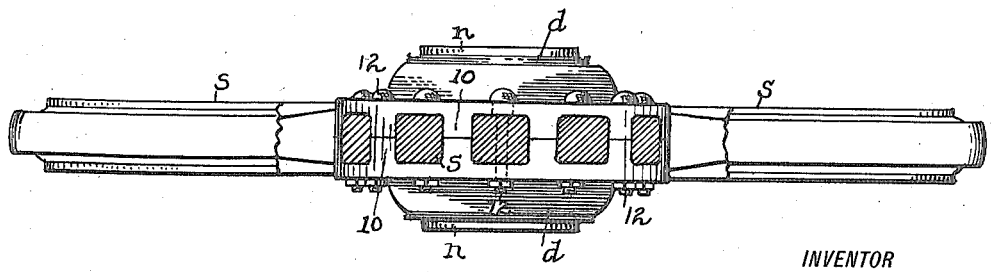

UNITED STATES PATENT OFFICE.

WILLIAM SCHOELLKOPF, OF CLEVELAND, OHIO.

SPRING-CUSHIONED AUTOMOBILE-WHEEL.

1,270,445.  Specification of Letters Patent.  Patented June 25, 1918.

Application filed April 16, 1917, Serial No. 162,336. Renewed May 4, 1918. Serial No. 232,660.

*To all whom it may concern:*

Be it known that I, WILLIAM SCHOELL-KOPF, citizen of the United States, residing at Cleveland, in the county of Cuyahoga and State of Ohio, have invented certain new and useful Improvements in Spring-Cushioned Automobile-Wheels, of which the following is a specification.

This invention pertains to a spring cushioned automobile wheel of novel and original construction, substantially as shown and described and particularly pointed out in the claims.

In the accompanying drawings, Figure 1 is a side elevation of a wheel embodying my invention and partially sectioned in the hub. Fig. 2 is a cross section on the irregular line 2—2, Fig. 1, and Fig. 3 is a cross section on line 3—3, Fig. 1.

Fig. 4, Sheet 2, is a perspective view of the wheel bushing and Fig. 5 is a perspective view of the cushioning or resilient rubber body adapted to be engaged over said bushing and disposed centrally within the hub of the wheel about the axis thereof as the single cushioning member.

Fig. 6 is a perspective view of one of the several spokes and Fig. 7 is a perspective view of one of the side clamping plates showing the inner side thereof. Fig. 8 is a horizontal cross section of the wheel as shown in Fig. 1 and taken on a line traversing several of the spokes next above the clamping plates and disclosing especially the relation of the lugs on said plates to the spokes, as hereinafter fully described.

As thus shown it will be observed, first, that the cushioning or spring member or body $b$ is a practically solid rubber embodiment, having transverse slots 2 and ribs or projections 3 radially about its periphery which are adapted, in a sense, to seat the tenons 4 at the inner ends of the spokes $s$, and said member also has a bore or opening 5 centrally through the middle thereof and radial slots 6 therefrom to receive the radial vanes 7 of a bushing $a$ which is free to revolve on or is fixed to an axle, not shown.

The said spring or cushioning member or body is designed to be made of a grade and quality of rubber which will stand up under the exacting service to which automobile wheels are usually subjected and which will unavoidably come upon it as the primary yielding element in the wheel, and which at the same time is designed to have practically all the yielding or cushioning value of a pneumatic tire in so far as absorbing shock and affording the needed resiliency is concerned. These objects and requirements are obtained in and through said body in conjunction with the other parts of the wheel in the relation shown, and which are especially adapted to make the spring action of said body effective and to afford equable distribution of the burden and conservation of the said member under the weight and drive of the machine.

Assuming that the wheel is to be driven by a power axle, the rotary power must be conveyed to the wheel exclusively through the bushing $a$ having the vanes 7 radially about the same, and these vanes are seated in the said body and engage the radially-slotted disks $d$ at each side of the wheel to positively drive the wheel. However, the slots 8 in plates $d$ are deep and wide enough to afford a free movement of the vanes 7 therein in the working movements of the parts while the wheel is under motion, and the end edges of the vanes are preferably rounded to promote an easy working action and rubbing contact at the side edges of the slots 8. The limited play afforded by the vanes in the slots operates to protect the rubber body from cutting out in a given circle, as might otherwise under the strain of driving the wheel. In other words, the power is transmitted to the wheel through the two opposite clamping plates or disks $d$ of metal and the wooden spokes $s$ engaged or clamped between the same, and these spokes are partially seated in said rubber member with the tenons 4 entering the peripheral slots 2 thereof and the lateral shoulders 9 of said spokes seated upon the rubber ribs or projections 3. The plates 3 have lugs 10 projected laterally therefrom at intervals on their inside next to their outer edge, and corresponding lugs on the two plates are placed in abutting relation opposite the rubber ribs 3, and the base portion of each spoke is seated between two of these lugs, as seen in Fig. 8. Clamping bolts 12 extend through said plates and spokes and lock said parts firmly together, and the plates $d$ compress and clamp the rubber ribs 3 between them, see Fig. 3.

It will be seen that the clamping plates $d$ are dished in their middle portion with flat matching rims about the same through which said bolts 12 extend, the dish or concavity in said plates being of such size in respect to the rubber body b that an annular chamber or space 14 is made within the hub of the wheel which is relatively larger than said body all around the same as the space 14 indicates and which enables said body b to exercise its spring action continuously as the wheel revolves and to absorb jolts in passing over obstructions or uneven roadways. Thus, the side clamping plates and the spokes and the rim of the wheel together constitute a rigid unitary wheel frame which encircles and incloses the rubber body b within the hub thereof in a cushioning relation and through which said wheel frame not only is driven but also loses its vibrations.

Auxiliary to the foregoing the extremities of the bushing sleeve a extend outward beyond the vanes 7 thereon and are externally screw-threaded to receive the flat disks or clamping nuts n, which are made large enough in diameter to overlap and close the slotted flattened central side portions of the clamping plates on which they slide, and the middle opening or hole in each side plate is large enough to afford free play for the bushing a all around therein. This further accommodates the free action of the wheel frame above referred to as an independent working unit in respect to the rubber body, and also makes a dust proof chamber for said body b within the hub inclosure. For further protection, I may screw separate caps 15 and 16 upon the outside of plates d substantially as shown in Fig. 3.

The rubber body and the bushing a with its vanes and substantially disk-shaped nuts constitute one working unit, and the spokes with the tire rim and the clamping plates another unit, and the transmission of power is through one unit to the other unit where interlocked as described but still allowing for the free operation of said rubber body as the single spring or resilient element.

What I claim is:

1. A wheel comprising a single resilient member at the center thereof having a bore axially through the same and slots radiating from said bore, side plates for said wheel having slots radially therein, and a bushing in said bore having vanes engaged in the slots of both said member and the side plates.

2. A wheel having radially-slotted side plates, a rubber body clamped at its peripheral edge between said plates having a radially-slotted bore, a bushing having radial vanes extending into the radial slots of said plates and body, nuts secured upon said bushing in engaging relation with said plates, and caps affixed to said plates and covering said nuts.

3. In a vehicle wheel, a central rubber body having radially disposed ribs about its periphery and slots between said ribs, spokes occupying said slots and shouldered to seat half way across one of said ribs at each side, plates of substantially dish shape forming a chamber between them for said rubber body and clamped upon said spokes, and a bushing in said body having radial vanes engaged with said plates.

4. A wheel having a one piece rubber body at its center of circular formation and having convex sides and ribs and slots alternately about its periphery, in combination with spokes having tenons filling said slots and shoulders seated on said ribs, dish shaped side plates inclosing said body and clamped upon said spokes and each having a series of lugs inside at the outer edge thereof extending between said spokes, and a bushing in said body projecting through said plates at its ends and having radial vanes operatively engaged with said body and said plates.

5. A wheel having a rigid frame comprising the spokes and the rim and a pair of plates bulged outwardly in their body portion to form a chamber between them and having flat outer portions provided with inwardly projecting lugs oppositely in abutting relations between said spokes and bolts locking said spokes and plates together, the said plates having radial slots in their inner portion, in combination with a central resilient rubber body occupying said chamber between said plates and having slots in which said spokes are seated and interlocked therewith, a tubular bushing having radial vanes interlocked with said body and engaged at their respective ends in the radial slots in said plates.

Signed at Cleveland, in the county of Cuyahoga, and State of Ohio, this 9th day of April, 1917.

WILLIAM SCHOELLKOPF.